United States Patent [19]
> Miller

[11] 3,740,170
[45] June 19, 1973

[54] TURBOCHARGER COOLING AND LUBRICATING SYSTEM

[75] Inventor: Elbert H. Miller, East Peoria, Ill.

[73] Assignee: Caterpillar Tractor Co., Peoria, Ill.

[22] Filed: Apr. 23, 1971

[21] Appl. No.: 111,016

[52] U.S. Cl. .................. 417/407, 60/13, 184/6.11, 60/39.08
[51] Int. Cl. ........................................... F04b 17/00
[58] Field of Search............................ 60/13, 39.08; 417/407; 415/175; 184/6.11; 277/22

[56] References Cited
UNITED STATES PATENTS

| | | | |
|---|---|---|---|
| 2,854,296 | 9/1958 | Eberle et al. ...................... | 417/409 |
| 3,180,568 | 4/1965 | Oettle ................................ | 415/175 |
| 3,411,706 | 11/1968 | Woolenweber ................... | 417/407 |
| 2,992,842 | 7/1961 | Sheychenko et al.............. | 277/22 |
| 3,241,842 | 3/1966 | Schweiger et al................. | 277/22 |
| 2,234,777 | 3/1941 | Puffer ............................... | 60/13 |
| 3,398,526 | 8/1968 | Olah ................................. | 60/39.08 |
| 3,170,292 | 2/1965 | Howes et al. .................... | 60/39.08 |
| 2,791,090 | 5/1957 | Hooker ............................. | 60/39.08 |

FOREIGN PATENTS OR APPLICATIONS 318,967    1/1957    Switzerland........................ 60/39.08

Primary Examiner—Carlton R. Croyle
Assistant Examiner—Warren Olsen
Attorney—Fryer, Tjensvold, Feix, Phillips & Lempio

[57] ABSTRACT

A turbocharger comprises a turbine wheel and compressor impeller secured to a common shaft rotatably mounted in spaced bearings. A primary passage means communicates oil between the bearings for lubrication purposes. A secondary passage means connects with the primary passage means to bypass some oil around the bearing positioned adjacent to the turbine wheel. The lubricating oil from the two passage means combine adjacent to the turbine wheel to form a substantial heat barrier thereat to prevent undue heat concentrations and carbon buildup.

2 Claims, 3 Drawing Figures

Patented June 19, 1973

3,740,170

INVENTOR
ELBERT H. MILLER

BY
ATTORNEYS

TURBOCHARGER COOLING AND LUBRICATING SYSTEM

BACKGROUND OF THE INVENTION

The lubricated bearing and sealing areas adjacent to the turbine stage of a conventional turbocharger are normally exposed to high temperature levels during turbocharger operation. The high temperatures tend to at least partially decompose the employed lubricating oil and attendant parts to form carbon deposits at such critical areas. For example, the formed carbon deposits may impede lubricant flow through critical areas adjacent to the turbine wheel to give rise to sealing, bearing and related problems. Conventional turbochargers primarily rely on a heat shield, forming an integral part of the turbocharger's housing, for impeding the transfer of heat to such critical areas.

OBJECTS AND SUMMARY OF THIS INVENTION

An object of this invention is to overcome the above, briefly described problems by providing a highly efficient and non-complex cooling and lubricating system for a turbocharger. The turbocharger comprises a turbine wheel and compressor impeller secured to a common shaft rotatably mounted in at least one bearing positioned adjacent to the turbine wheel. Lubricating oil is communicated by primary passage means to the bearing and passes therethrough for lubrication purposes. A secondary passage means communicates with the primary passage means to bypass some lubricating oil around the bearing. The lubricating oil from the two passage means combine at an outlet passage means which returns the combined flow back to a pressurized oil source.

BRIEF DESCRIPTION OF THE DRAWING

Other objects of this invention will become apparent from the following description and accompanying drawing wherein.

DESCRIPTION OF THE PREFERRED EMBODIMENTS

Figure 1:
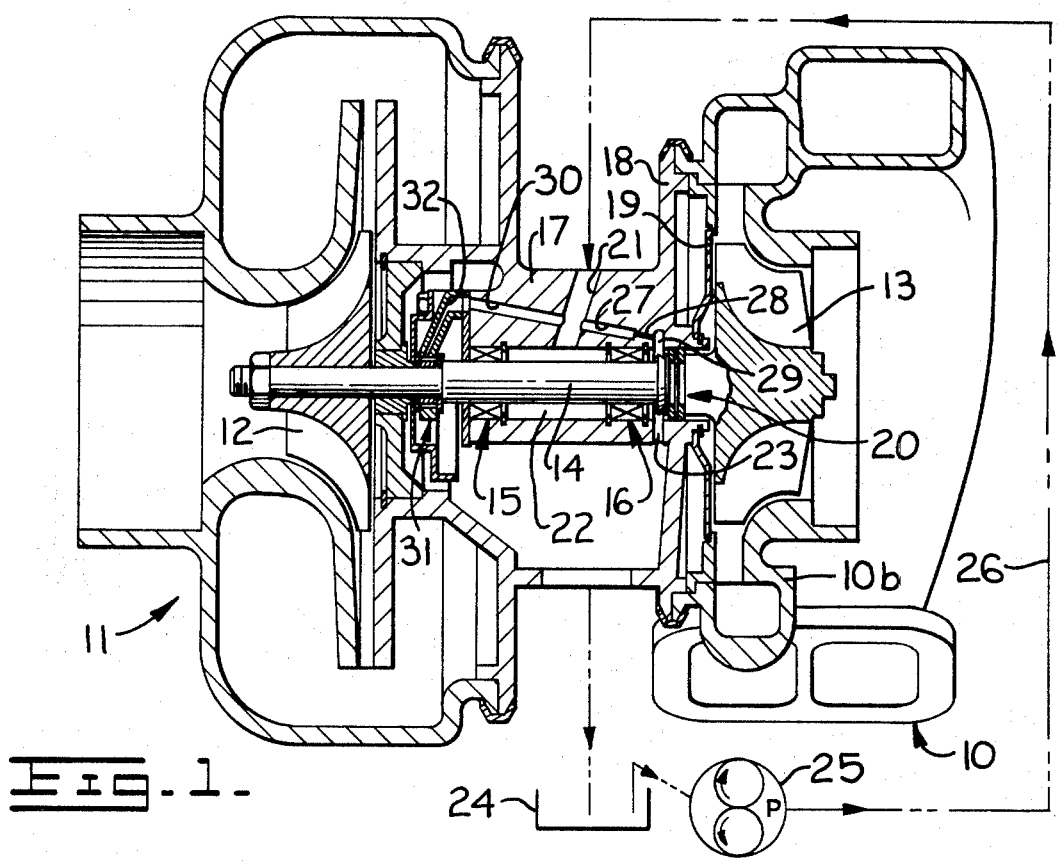
FIG. 1 is a cross-sectional view of a turbocharger employing the cooling and lubricating system of this invention therein.

FIG. 1 illustrates a turbocharger comprising a turbine stage 10 and a compressor stage 11. A bladed impeller 12 and bladed turbine wheel 13 are mounted for rotation in a conventional manner on a common shaft 14. The shaft is mounted to rotate about a longitudinal axis thereof in spaced bearing means 15 and 16 with the latter bearing means being positioned closely adjacent to the turbine wheel.

A stationary multi-part housing 17 encloses the operating components of the turbocharger and comprises a wall 18 and baffle plate 19. Conventional sealing means shown in the form of ring seals 20 are mounted between shaft 14 and the housing to cooperate with wall 18 and baffle plate 19 for preventing turbine exhaust gases and lubricating oil from passing thereby. Lubricating means for bearing 15 and 16 comprises primary passage means 21 for communicating lubricating oil to an annular chamber 22 formed between the housing and the bearings.

Such lubricating oil passes through by bearing 16, for example, and discharges into a drain passage or outlet passage means 23 positioned between the turbine wheel and bearing means 16. The drain passage communicates with a pressurized lubricating oil source means comprising an oil pan 24 and gear pump 25. A line 26 returns the lubricating oil to the inlet of primary passage means 21. If so desired, a conventional heat exchanger (not shown) may be suitably incorporated into line 26 to further reduce the oil's temperature.

As stated above, high temperatures are occasioned at turbine stage 10 during turbocharger operation. Metallic housing 10b tends to conduct such temperatures to critical areas adjacent to bearing 16 and sealing means 20. Should the temperatures exceed a predetermined level at such areas, the oil and attendant parts tend to at least partially decompose to induce carbon deposit buildup thereat and in drain passage 23.

Should such carbon buildup and decomposition become unduly pronounced, bearing 16 may fail and sealing means 20 will become susceptible to leakage. In addition, "blow-by" which accumulates in housing 18 will tend to pass to atmosphere via the engine's breather pipe. Should the magnitude of such "blow-by" become unduly high, the engine may be rendered unfit for use.

This invention substantially eliminates such problems by providing cooling means comprising a secondary passage means 27 communicating with primary passage means 21 to by-pass a predetermined amount of lubricating oil around bearing means 16. The secondary passage means preferably terminates in a restricted orifice 28 which discharges the secondary oil flow directly into an upper passage portion 29 of discharge passage 23. It should be noted that the orifice thus preferably discharges such oil at a position radially outwardly from seals 20 to prevent damage thereof due to the force of the discharged oil.

The secondary oil flow then combines with the primary oil flow, occasioned through bearing means 16, in drain passage 23. A continuous flow of the secondary oil functions to constantly cool and wash the area adjacent to the bearing and seals to prevent carbon deposit build-up and unduly high heat concentrations thereat. Additional passage means 30 communicates with main passage means 21 to communicate lubricating oil to a thrust bearing 31 via a passage 32.

Oil flow from annular chamber 22 will pass through bearing means 15 and combine with the oil flow from passage 32. The combined oil flow is subsequently received by oil pan 24. It should be noted that the compressor stage does not experience the high heat levels occasioned in the turbine stage and thus the carbon deposit and related problems are not as apparent therewith.

Figure 2:
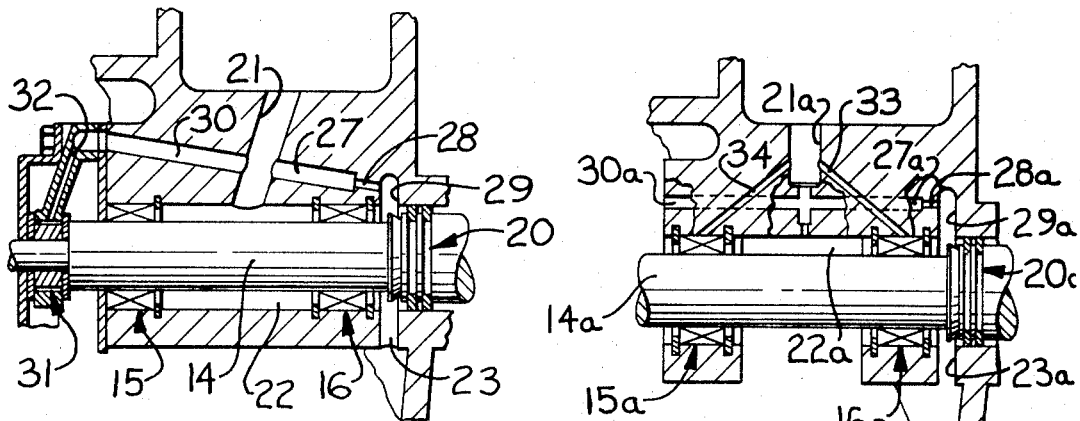
FIG. 2 is an enlarged view of such system.
Figure 3:
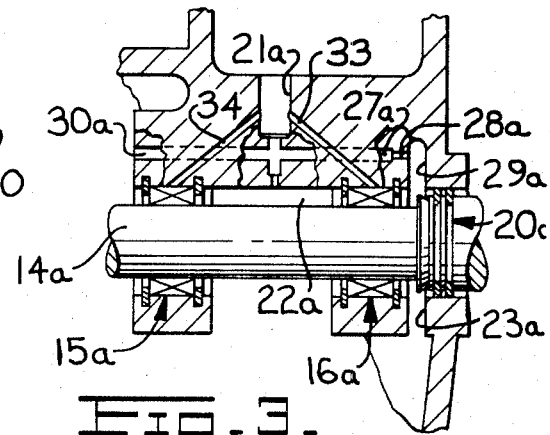
FIG. 3 is a sectional view, similar to FIG. 2, disclosing a modified form of the FIGS. 1 and 2 cooling and lubricating system.

FIG. 3 illustrates a modified form of the FIGS. 1 and 2 cooling and lubricating system. Corresponding constructions are depicted by like numerals with each FIG. 3 numeral being accompanied by an "a."

Such embodiment discloses a secondary passage means 27a and a passage 30a as being disposed in parallel relationship relative to the longitudinal axis of a turbocharger shaft 14a. Also, additional passage means 33 and 34 directly communicate a primary passage means 21a with bearing means 16a and 15a, respectively.

I claim:

1. A turbocharger comprising a housing, a shaft mounted for rotation about a longitudinal axis thereof and having an impeller and a turbine wheel attached to opposite ends thereof for simultaneous rotation therewith, a first bearing means, positioned closely adjacent to said turbine wheel, rotatably mounting said shaft in said housing, lubricating means comprising primary passage means for communicating lubricating oil through said first bearing means for lubricating same, outlet passage means positioned between said first bearing means and said turbine wheel for receiving lubricating oil passed through said bearing means, annular sealing means positioned axially between said turbine wheel and said outlet passage means, and cooling means comprising a secondary passage means formed in said housing directly communicating said primary passage means with said outlet passage means and terminating thereat in a restricted passageway leading into a radially disposed passageway relative to said longitudinal axis adjacent to said sealing means for constantly cooling and washing the area between said first bearing means and said sealing means, a second bearing means spaced from said first mentioned bearing means in the direction of said longitudinal axis to define an annular chamber with said housing, said primary passage means communicating with said annular chamber, thrust bearing means mounted about said shaft between said impeller and said second bearing means, additional passage means communicating said primary passage means with said thrust bearing for communicating lubrication oil thereto, and a pressurized source means for continuously communicating lubricating oil to said primary passage means from said outlet passage means.

2. The turbocharger of claim 1 wherein additional passage means communicate said primary passage means directly to each of said first and second bearing means for communicating lubrication oil thereto.

* * * * *